Feb. 19, 1946.   E. F. CROSBY   2,395,039
COMBINATION STOCK AND GASOLINE TRAILER
Filed Sept. 19, 1942   2 Sheets-Sheet 1
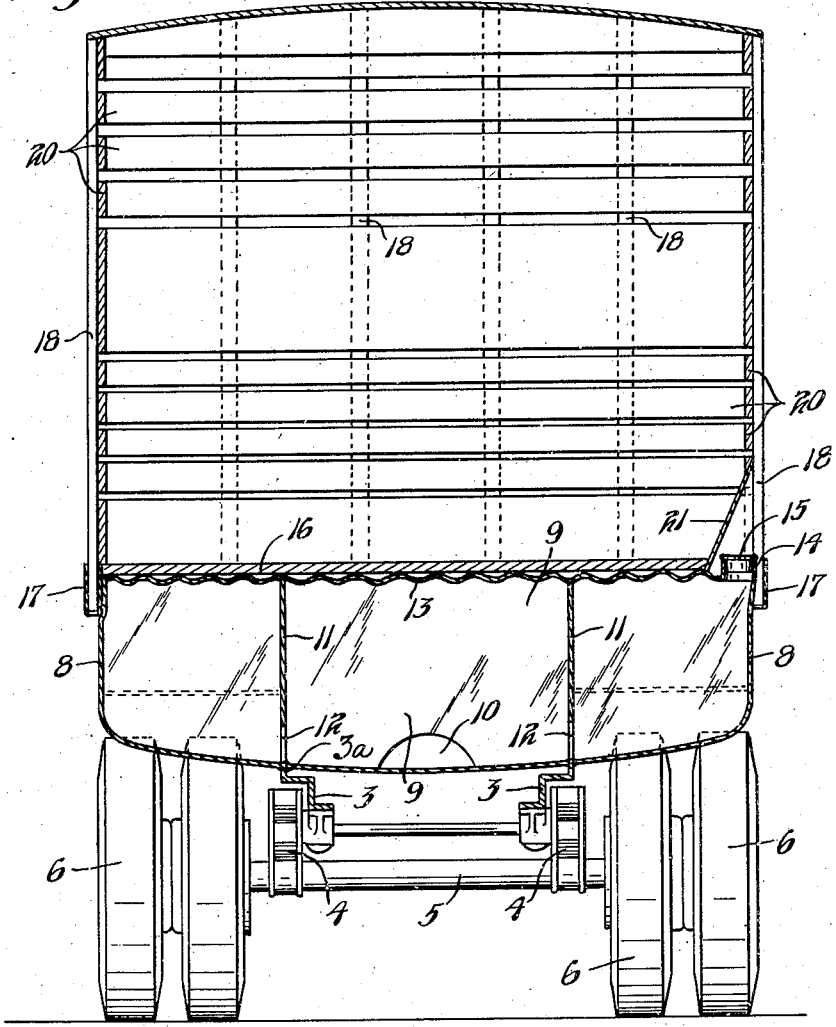
INVENTOR.
EDWARD F. CROSBY.
BY HIS ATTORNEYS.
Williamson & Williamson

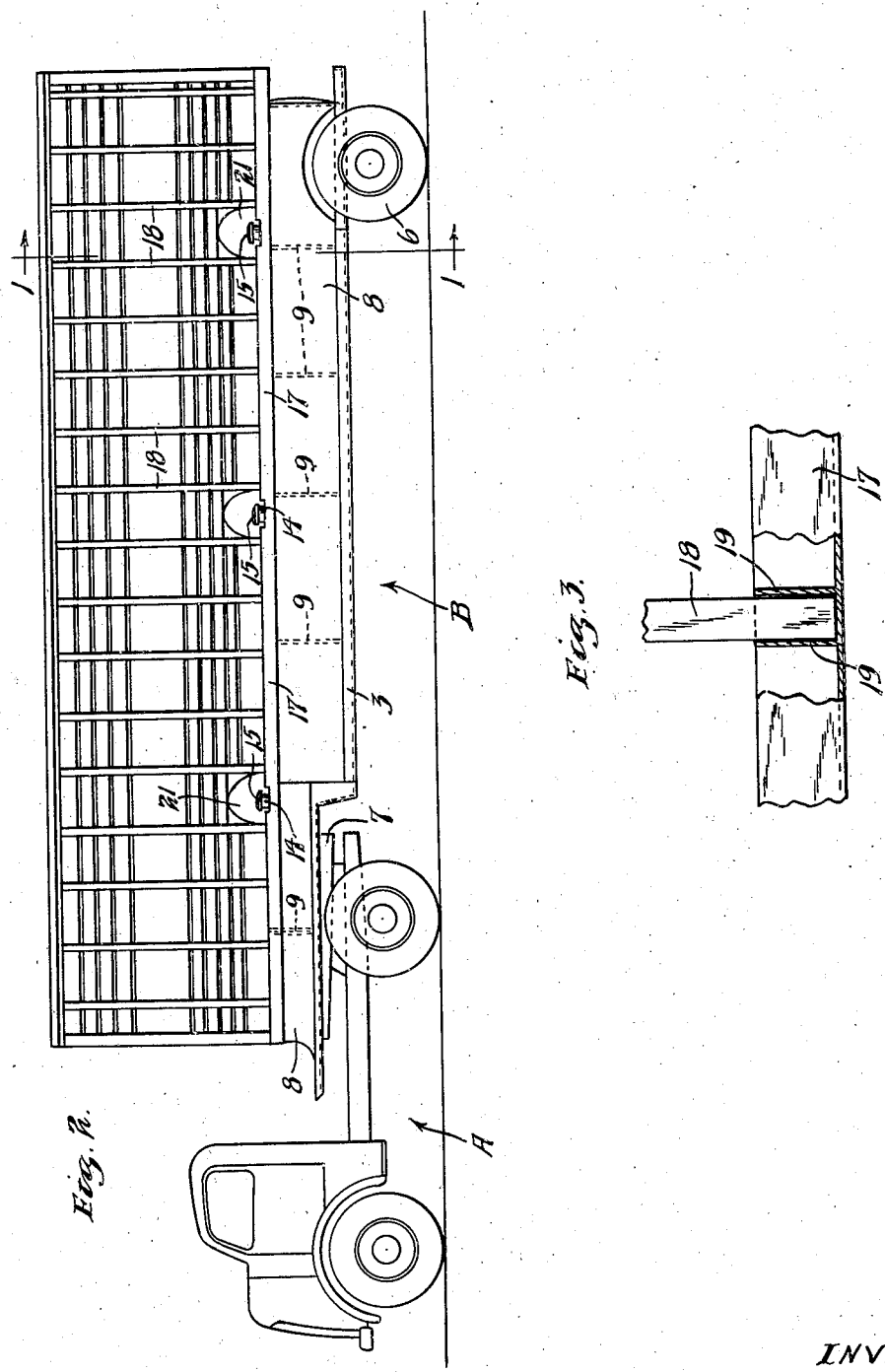

UNITED STATES PATENT OFFICE 2,395,039

COMBINATION STOCK AND GASOLINE TRAILER

Edward F. Crosby, St. Paul, Minn.

Application September 19, 1942, Serial No. 459,003

1 Claim. (Cl. 280—5)

This invention relates to vehicle constructions and more particularly to combined tank and stake body commercial vehicles.

It is an object of my invention to provide a combination vehicle having a relatively low slung tank thereon and a stake body having a deck supported entirely by the tank wherein improved means is utilized for supporting and strengthening the tank so that relatively heavy freight loads can be carried thereon.

Another object of the invention is to provide a rub rail along the sides of the tank and to so arrange the rub rail that stakes can be mounted thereon.

Still another object of the invention is to provide a tank with a freight carrying body mounted thereon and to so arrange the tank that filler spouts are conveniently located so that they are accessible at all times and are protected against damage.

These and other objects and advantages of the invention will more fully appear from the following description made in connection with the accompanying drawings, wherein like reference characters refer to the same parts throughout the views, and, in which:

Fig. 1 is a transverse sectional view taken approximately on the line 1—1 of Fig. 2;

Fig. 2 is a side elevation on a reduced scale; and

Fig. 3 is an enlarged detail of a stake socket.

In Fig. 2 there is shown a tractor generally indicated at A. Mounted thereon is a semi-trailer B which includes a pair of frame members in the form of heavy Z-bars 3 supported on springs 4 shown in Fig. 1, a rear axle 5 and wheels 6. The frame members extend forwardly and are stepped up adjacent their forward ends and have a fifth wheel assembly 7 secured thereto. It should be noted in Fig. 1 that the frame members 3 have vertically extending upper web portions 3a rather than the conventional channels.

Supported on the frame members 3 is a tank 8 which is provided with a plurality of transverse strengthening partitions 9 having suitable flow openings 10 and which also has a pair of spaced longitudinal extending partitions 11 having flow openings 12 at spaced points thereon. Particular attention should be given to the location of the partitions 11 which is in direct vertical alignment with the upper vertical extending web portions of the frame members 3 which in effect constitutes a continuous vertical support upwardly to the corrugated tank top 13, said top being corrugated to strengthen it. Otherwise, however, the tank top is relatively flat throughout its entire expanse.

Any suitable drain outlets can be provided and none are shown, but there is indicated a group of three filler spouts 14 having suitable caps 15. The tank, as shown, is divided into three separated compartments each being fillable through one of the filler spouts 14. To this end two of the partitions 9 are not recessed at their central portions as in the case of the other partitions 9 and the edges of these partitions, as in the case of the other partitions, are welded to the bottom and sides of the tank 8. The upper edges of the partitions 9 are welded to the top 13 of the tank and the edges of the longitudinal partitions 11 at top and bottom are also welded to the top 13 and bottom of the tank 8, said partitions 11 and 9 making a stronger reinforced crate structure upon which the crate supported deck and load are directly supported.

Supported directly on the relatively flat corrugated tank top 13 is a freight supporting deck 16. The deck is prevented from shifting by a substantially channel shaped rub rail 17 which extends along either side of the tank 8 and which is preferably welded to said tank.

In Fig. 3 there is shown an enlarged detail of the channel shaped rub rail 17 with the lower portion of a body stake 18 positioned therein. In order to keep the body stakes 18 in position I provide a pair of spaced transverse members 19 for each body stake. In this manner the stakes are positioned securely but are easily removable. The stakes 18 have longitudinally disposed boards 20 suitably secured thereto in the manner of a conventional wagon or truck body. As shown in the drawings, the lower two boards 20 are cut away between stakes flanking the filler spouts 14, and in these cut away portions are positioned shields 21 which give access to the filler spouts and at the same time afford protection for them so that goods stored in the upper freight carrying portion cannot come into contact with said spouts and, as is best illustrated in Fig. 1, said filler spouts lie inside of one of the rub rails 17 so that said spouts will not be damaged.

From the foregoing description it will be seen that I have provided a simply constructed yet highly efficient and strong vehicle body which permits the carriage of liquids in the lower tank portion and solid freight pieces in the wagon body portion which is supported entirely by the re-enforced tank structure. No bracing super structure is needed. While the tank is completely covered the filler spouts are conveniently accessible, It should also be remembered that the longitudinal frame members 3 and the longitudinal tank partitions 11 provide a continuous support upwardly throughout the tank to the tank top 13. The construction is simple but amply rugged to carry heavy loads. Of course, with such a combined body structure it is possible to carry pay loads of freight when the vehicle is returning empty insofar as the tank is concerned after having made a delivery of gasoline or some other liquid product.

It will, of course, be understood that various changes may be made in the form, details, arrangement and proportions of the various parts without departing from the scope of my invention.

What is claimed is:

In a vehicle body having a combined tank portion and superposed freight carrying portion, said freight carrying portion including a deck extending over substantially the entire upper portion of said tank and supported thereby, a rub rail formed along the upper longitudinal portions of said tank, said rub rail being substantially U-shaped in cross section and welded to one side of said tank adjacent its upper edge, pairs of relatively closely spaced transverse members in said channel shaped rub rail, and stakes having their lower ends removably inserted in the spaces between said relatively closely spaced pairs of members in said rub rail.

EDWARD F. CROSBY.